Patented Feb. 27, 1940

2,191,748

UNITED STATES PATENT OFFICE 2,191,748

CHLORINATED RUBBER PRODUCT

John Philip Baxter, Widnes, Lancaster, and Leonard Thane Dod, Crosby, Liverpool, England, assignors to Imperial Chemical Industries Limited, a corporation of Great Britain No Drawing. Application December 6, 1937, Serial No. 178,418. In Great Britain December 15, 1936

4 Claims. (Cl. 260—727)

This invention relates to the manufacture of derivatives of rubber and more particularly to the vulcanization of partly chlorinated rubber.

It is well known that plastic or thermoplastic products can be made by chlorinating rubber, and incorporating with the product fillers, pigments, resins, and like materials, and it has been proposed to use both crepe rubber and previously vulcanized rubber for this purpose, e. g. rubber scrap, or vulcanized latex. It has also been proposed to vulcanize and chlorinate rubber simultaneously by passing into a solution of the rubber a gaseous mixture of chlorine and sulfur chloride. Further, it has been proposed to prepare useful products by combining a chlorinated rubber with the product obtained by reacting sulfur with benzene and its homologues in the presence of aluminium chloride, and by heating a partially chlorinated rubber with a polysulfide and an aryl halide.

This invention has as an object the preparation of new materials. A further object is the preparation of materials useful in the manufacture of films, porous blocks, molding powders, plastics and adhesives. A still further object is the provision of methods of manufacturing chlorinated rubber products which will combine some of the properties of chlorinated rubber, such as resistance to flame and attack by oils, with some of the properties of vulcanized rubber, such as the properties of lightly vulcanized rubber namely elasticity, flexibility, and resistance to wear, or the properties of heavily vulcanized rubber, such as hardness and durability. A further object is to provide chlorinated rubber products having the above properties. Other objects will appear hereinafter.

The objects are accomplished by the following invention wherein unvulcanized rubber is chlorinated to a chlorine content not more than about 20% and then vulcanized either alone or in admixture with highly chlorinated rubber.

Preferably, the rubber is chlorinated in solution, in one of the usual rubber solvents, e. g. benzene or toluene, and the chlorinated product is isolated from solution by distillation, steam distillation, spray drying, or otherwise. The solid product is then compounded on differential rolls with the agents usually employed in vulcanization processes, e. g. carbon black, sulfur, and an accelerator such as diphenylguanidine. Fillers, anti-oxidants and softeners may also be added. The mix is then subjected to a heat treatment either in a press (using dry heat) or in an autoclave by means of high pressure steam.

Vulcanization can also be performed by treating the partially chlorinated rubber with sulfur chloride, i. e. by the so-called "cold process," though of course this method is most suited to the treatment of thin walled articles or of thin layers of the partially chlorinated rubber. For example, the method may be used if it is desired to coat an article with a product according to the invention. A coat of partially chlorinated rubber is first applied, e. g. by brushing on a solution of the chlorinated rubber in a volatile solvent and allowing the solvent to evaporate, and then vulcanized with sulfur chloride in situ.

The so-called "hot process" is more suitable for the treatment of articles of substantial thickness, the mix of partially chlorinated rubber, vulcanizing reagents, fillers, pigments, etc., being molded into shape before the heating step is carried out. Products so obtained after the heating step have good strength and pliability, and are rather less elastic than similar products obtained from crepe rubber. It also appears that the materials produced according to our invention swell less under the influence of solvents such as petroleum ethers, oils, etc., than do similar vulcanizates from ordinary crepe rubber.

The preparation of the partially chlorinated rubber may conveniently be carried out by passing chlorine into a solution of the rubber in a solvent such as benzene, toluene, or preferably a chlorinated solvent such as carbon tetrachloride; when sufficient chlorine has been introduced (as determined by the loss in weight of the chlorine container or other like method) the supply of gas is cut off, dissolved gases removed by air blowing, etc., and the product isolated from solution by precipitation with methanol, or preferably by steam distillation. The solid so obtained is then dried with hot air preferably after a wash with a dilute alkali, e. g. ammonia, to remove the last traces of chlorine or hydrochloric acid.

The degree to which the rubber is chlorinated (within the range of 0–20%) does not appear to be critical, and valuable products have been prepared from materials containing 6% chlorine and 12½% chlorine. Products containing as little as 2% chlorine may also be used. Nevertheless, considerable variations in the properties of the vulcanizate do occur with variation in the degree of chlorination. Thus, while all the products prepared by the present invention have the advantage that they swell less under the influence of such solvents as petroleum ethers, oils and the like, than do similar vulcanizates prepared from ordinary crepe rubber, it has been found that with a given method of vulcanization and under given conditions of temperature, the product prepared from say, a partially chlorinated rubber containing 14% chlorine absorbs oil to only two-thirds the extent of one containing 4–5% chlorine, while with one containing 16% chlorine only about one third as much is absorbed. On the other hand, if it is desired that the product shall have a relatively high elasticity, a partially chlorinated rubber should be chosen with a low chlorine content. We find also that there is some variation in the rate at which vulcanization proceeds in products of differing chlorine content, those with a comparatively small chlorine content requiring a more extended treatment than those which are more highly chlorinated.

The following examples illustrate but do not limit our invention, all parts being by weight.

Example I

A partially chlorinated rubber containing 6% chlorine was prepared by passing chlorine into a solution of crepe rubber in carbon tetrachloride, and then removing the solvent by steam distillation. The solid was dried in a current of warm air. A mix was then made having the following composition:

|  | Parts |
|---|---|
| Partially chlorinated rubber | 100 |
| Zinc oxide | 15 |
| Carbon black | 50 |
| Sulfur | 10 |
| Diphenyl guanidine | 1 |

Sheets of vulcanizate were then made by heating the mix in a press for 90 minutes at 140–145° C. The product was similar in appearance to a normal vulcanized rubber of similar compounding, being tough and flexible although somewhat less elastic in nature.

To test the swelling properties of the sheets, weighed discs of 16 mm. diameter and 4 mm. thickness where immersed in petroleum ether at 20° C., withdrawn at intervals, surplus liquid rapidly dried off, and the discs re-weighed. After 5 hours immersion the discs had increased in weight by 40%, and after 100 hours by 89%.

Discs made by vulcanizing masticated crepe rubber in a similar way and using a similar mix, increased in weight by 60% after 5 hours immersion in petroleum ether, and by 160% after 100 hours immersion.

Example II

A vulcanizate was made as in Example I, using a chlorinated rubber prepared in like manner and containing 12½% chlorine. The vulcanized sheets were harder and less flexible than those obtained in Example I, but still retained a measure of flexibility.

Discs made from the product of size 16 mm. diameter and 4 mm. thickness, increased in weight 10% on immersion in petroleum ether for 5 hours, and 28% on immersion for 100 hours.

Example III

A partially chlorinated rubber containing 12½% chlorine was used for making the following mix:

|  | Parts |
|---|---|
| Partially chlorinated rubber | 100 |
| Zinc oxide | 10 |
| Stearic acid | 1 |
| Sulfur | 2.5 |
| Mercaptobenzthiazole | 0.5 |
| Triethanolamine | 5 |

The vulcanization was then effected by heating in a press for 45 minutes at 141° C. The product had the following properties:

| Elongation before breaking | per cent | 325 |
|---|---|---|
| Tensile strength | kgs./sq. cm. | 60 |
| Increase in volume on immersion in Diesel oil at 70° C. | per cent | 225 |

Example IV

A partially chlorinated rubber containing 6% chlorine was used for the following mix:

|  | Parts |
|---|---|
| Partially chlorinated rubber | 100 |
| Magnesium carbonate | 10 |
| Zinc oxide | 10 |
| Mercaptobenzthiazole | 0.375 |
| Sulfur | 6 |
| Triethanolamine | 5 |

The vulcanization was then effected by heating in an autoclave for 45 minutes at 141° C. The product was similar in appearance to vulcanizates obtained by a like method from untreated rubber, and had the following physical properties:

| Tensile strength | kgs./sq. cm. | 108 |
|---|---|---|
| Elongation at breaking point | per cent | 525 |
| Increase in volume on immersion in Diesel oil at 70° C. | per cent | 275 |

Example V

A partially chlorinated rubber containing 6% chlorine was used for the following mix:

|  | Parts |
|---|---|
| Partially chlorinated rubber | 100 |
| Magnesium carbonate | 10 |
| Zinc oxide | 5 |
| Carbon black | 50 |
| Mercaptobenzthiazole | 0.75 |
| Sulfur | 3 |
| Triethanolamine | 5 |

Vulcanization was then effected as in Example III. The product was similar in appearance to one which had been similarly compounded from natural rubber and had the following properties:

| Tensile strength | kgs./sq. cm. | 70 |
|---|---|---|
| Elongation at breaking point | per cent | 250 |
| Increase in volume on immersion in Diesel oil at 70° C. | per cent | 180 |

Example VI

A mixture of equal parts of partially chlorinated rubber (6% chlorine) and fully chlorinated rubber (65% chlorine) was obtained by mixing the appropriate amounts of solutions of the two materials in carbon tetrachloride and removing the solvent by steam distillation, and dried on warm rolls. The mixture was then rolled into thin sheets and the latter vulcanized by dipping for 10 seconds into a 3% solution of sulfur monochloride in carbon tetrachloride at room temperature. The sheets when dried in a current of warm air were dark grey in color, tough, and fairly pliable. They were found to be highly resistant to flames and possessed a tensile strength of about 1000–1500 lbs./sq. in.

Useful products can also be prepared according to our invention by mixing the partially chlorinated rubber prior to vulcanization with a highly chlorinated rubber, i. e. one containing more than 55% chlorine, and preferably about 65% chlorine. Suitable mixtures are those described in co-pending British application 34487/36. According to this invention vulcanized products are obtained having a high chlorine content with a correspondingly enhanced resistance to flame and to attack by oils, and which yet retain at least in part the elasticity, flexibility and wear resistance of lightly vulcanized rubber, or the hardness and durability of ebonite depending on the extent to which the mixtures of the two chlorinated rubbers are vulcanized, and to some extent on the proportions of highly chlorinated rubber in the mix. With increasing proportions of highly chlorinated material the product becomes less and less plastic, and where the latter property is a valuable one, we prefer not to use a greater proportion of highly chlorinated rubber than 70% of the unvulcanized mixture. This limitation is, however, not essential, and by suitably choosing the proportion of the two constituents and the conditions of vulcanization, materials can be produced which are suitable for such varied uses as the manufacture of films, porous blocks, molding powders, plastics and adhesives.

Essentially unvulcanized plasticized or peptized rubber, e. g., that disclosed in Williams and Smith, U. S. Patents 2,018,643, 2,018,644 and 2,018,645 and applications Serial Numbers 36,324 filed August 15, 1935, and 40,090 filed September 11, 1935, may be chlorinated and then vulcanized according to the present process.

These materials in addition to the properties above disclosed possess a high specific electrical resistance and a low power factor, and are suitable for the manufacture of constructional insulating elements in electrical apparatus, for example, castings for condensers, small transformers, panels for switch gear and instruments and similar objects. These products containing a smaller proportion of highly chlorinated rubber and still retaining both flexibility, elasticity, and good wear resistance, may also be used for the manufacture of cable sheathings and the like, where their properties of non-inflammability and high resistance to oil are of special value.

The shaping of the components in the form which they possess when in the electrical apparatus may be accomplished either before or after the mixture of partially chlorinated rubber and highly chlorinated rubber has been treated with the vulcanizing agent, according to the ease of manipulation of the material before and after vulcanization and the particular constructional element being made. For example, many of the mixes of vulcanizing composition and chlorinated rubbers can be extruded, and thus where the nature of the element permits, it is convenient to extrude the mix into the shape of the final element and then to vulcanize the extruded material. This method can be applied very suitably in the process of sheathing cables with mixes according to our invention.

The above description and examples are intended to be illustrative only. Any modification of or variation therefrom which conforms to the spirit of the invention is intended to be included within the scope of the claims.

We claim:

1. A process which comprises chlorinating an unvulcanized rubber until it contains not more than 20% by weight of chlorine, mixing the product with chlorinated rubber containing more than 20% by weight of chlorine and subsequently vulcanizing the product so formed.

2. A process which comprises chlorinating an unvulcanized rubber until it contains not more than 20% by weight of chlorine, mixing the product with chlorinated rubber containing between 55 and 65% by weight of chlorine and subsequently vulcanizing the product so formed.

3. A vulcanizate of a mixture of chlorinated rubber containing not more than 20% chlorine with a chlorinated rubber containing more than 20% chlorine.

4. A vulcanizate of a mixture of chlorinated rubber containing not more than 20% chlorine with a chlorinated rubber containing 55-65% chlorine.

JOHN PHILIP BAXTER.
LEONARD THANE DOD.